United States Patent
Yao et al.

(10) Patent No.: US 11,556,243 B1
(45) Date of Patent: Jan. 17, 2023

(54) INFORMATION PROCESSING APPARATUS, INFORMATION PROCESSING SYSTEM, AND CONTROL METHOD

(71) Applicant: Lenovo (Singapore) Pte. Ltd., Singapore (SG)

(72) Inventors: Qiang Yao, Kanagawa (JP); Ryohta Nomura, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/837,292

(22) Filed: Jun. 10, 2022

(30) Foreign Application Priority Data

Jul. 8, 2021 (JP) .............................. JP2021-113535

(51) Int. Cl.
*G06F 3/04883* (2022.01)
*G06F 3/041* (2006.01)
*G06F 3/0354* (2013.01)

(52) U.S. Cl.
CPC ........ *G06F 3/04883* (2013.01); *G06F 3/0418* (2013.01); *G06F 3/03545* (2013.01)

(58) Field of Classification Search
CPC . G06F 3/03545; G06F 3/0418; G06F 3/04883
See application file for complete search history.

(56) References Cited

U.S. PATENT DOCUMENTS

| | | | |
|---|---|---|---|
| 9,529,525 B2 | 12/2016 | Skaljak et al. | |
| 9,703,473 B2 * | 7/2017 | Schillings | G06F 3/0418 |
| 9,753,579 B2 * | 9/2017 | Johansson | G06F 3/0485 |
| 9,921,745 B2 * | 3/2018 | Schillings | G06F 3/04883 |
| 10,628,029 B2 * | 4/2020 | Schillings | G06F 3/04883 |
| 2013/0271487 A1 * | 10/2013 | Lincoln | G06F 3/0488 345/157 |
| 2014/0118295 A1 * | 5/2014 | Motoi | G06F 3/04883 345/174 |
| 2014/0204036 A1 * | 7/2014 | Schillings | G06F 3/0418 345/173 |
| 2016/0041689 A1 * | 2/2016 | Yumoto | G06F 3/0446 345/174 |

(Continued)

FOREIGN PATENT DOCUMENTS

| | | |
|---|---|---|
| JP | 2005-118215 A | 5/2005 |
| JP | 2011-253406 A | 12/2011 |

*Primary Examiner* — Michael Pervan
(74) *Attorney, Agent, or Firm* — Osha Bergman Watanabe & Burton LLP

(57) ABSTRACT

An information processing apparatus, includes: a display unit, a touch sensor unit placed on a screen of the display unit to detect contact with an object on the screen; an input processing unit that selectively performs prediction processing for predicting the next detected position data on the basis of a plurality of past detected position data on the screen detected at predetermined detection intervals by the touch sensor unit when an operating medium contacts the screen and noise reduction processing for removing noise from the detected position data detected by the touch sensor unit for smoothing, according to a drawing status based on the detected position data, and then outputs the detected position data of a result of the selectively-performed processing, and a display processing unit that causes the display unit to display a movement locus on the screen.

9 Claims, 7 Drawing Sheets

(56) References Cited

U.S. PATENT DOCUMENTS

| | | | |
|---|---|---|---|
| 2016/0291788 A1* | 10/2016 | Johansson | G06F 3/04883 |
| 2017/0269829 A1* | 9/2017 | Schillings | G06F 3/04883 |
| 2018/0157410 A1* | 6/2018 | Schillings | G06F 3/04883 |
| 2018/0338065 A1 | 11/2018 | Zyskind et al. | |

* cited by examiner

INFORMATION PROCESSING APPARATUS, INFORMATION PROCESSING SYSTEM, AND CONTROL METHOD

CROSS-REFERENCE TO RELATED APPLICATIONS

This application claims priority to Japanese Patent Application No. 2021-113535 filed on Jul. 8, 2021, the contents of which are hereby incorporated herein by reference in their entirety.

TECHNICAL FIELD

The present disclosure relates to an information processing apparatus, an information processing system, and a control method.

BACKGROUND

In recent years, some information processing apparatuses, such as personal computers, have input devices capable of handwriting input. For such input devices, there is known a technology for displaying predicted input in order to reduce a delay in display in response to input.

SUMMARY

In one aspect of the present disclosure, an information processing apparatus includes a display including a touchscreen configured to detect contact on the touchscreen as position data, and a processor coupled to the display and programmed to: calculate a drawing speed based on a plurality of past detected position data on the touchscreen, the plurality of past detected position data being detected by the touchscreen at a predetermined detection interval, when the drawing speed is within a first numerical range, perform prediction processing, and when the drawing speed is within a second numerical range different from the first numerical range, perform smoothing processing, wherein the prediction processing includes predicting a future position data based on at least a subset of the plurality of past detected position data and controlling the display to display based on the future position data, and the smoothing processing includes removing noise from at least a subset of the plurality of past detected position data to generate a plurality of smoothed position data and controlling the display to display based on the plurality of smoothed position data.

In an other aspect of the present disclosure, an information processing apparatus according to the first aspect of the present disclosure includes: a display unit; a touch sensor unit placed on a screen of the display unit to detect contact with an object on the screen; an input processing unit that selectively performs prediction processing for predicting the next detected position data on the basis of a plurality of past detected position data on the screen detected at predetermined detection intervals by the touch sensor unit when an operating medium contacts the screen and noise reduction processing for removing noise from the detected position data detected by the touch sensor unit for smoothing, according to a drawing status based on the detected position data, and then outputs the detected position data of a result of the selectively-performed processing; and a display processing unit that causes the display unit to display a movement locus on the screen, the movement locus having been made by the operating medium moving in contact with the screen, on the basis of the detected position data output by the input processing unit.

DETAILED DESCRIPTION

Figure 1:
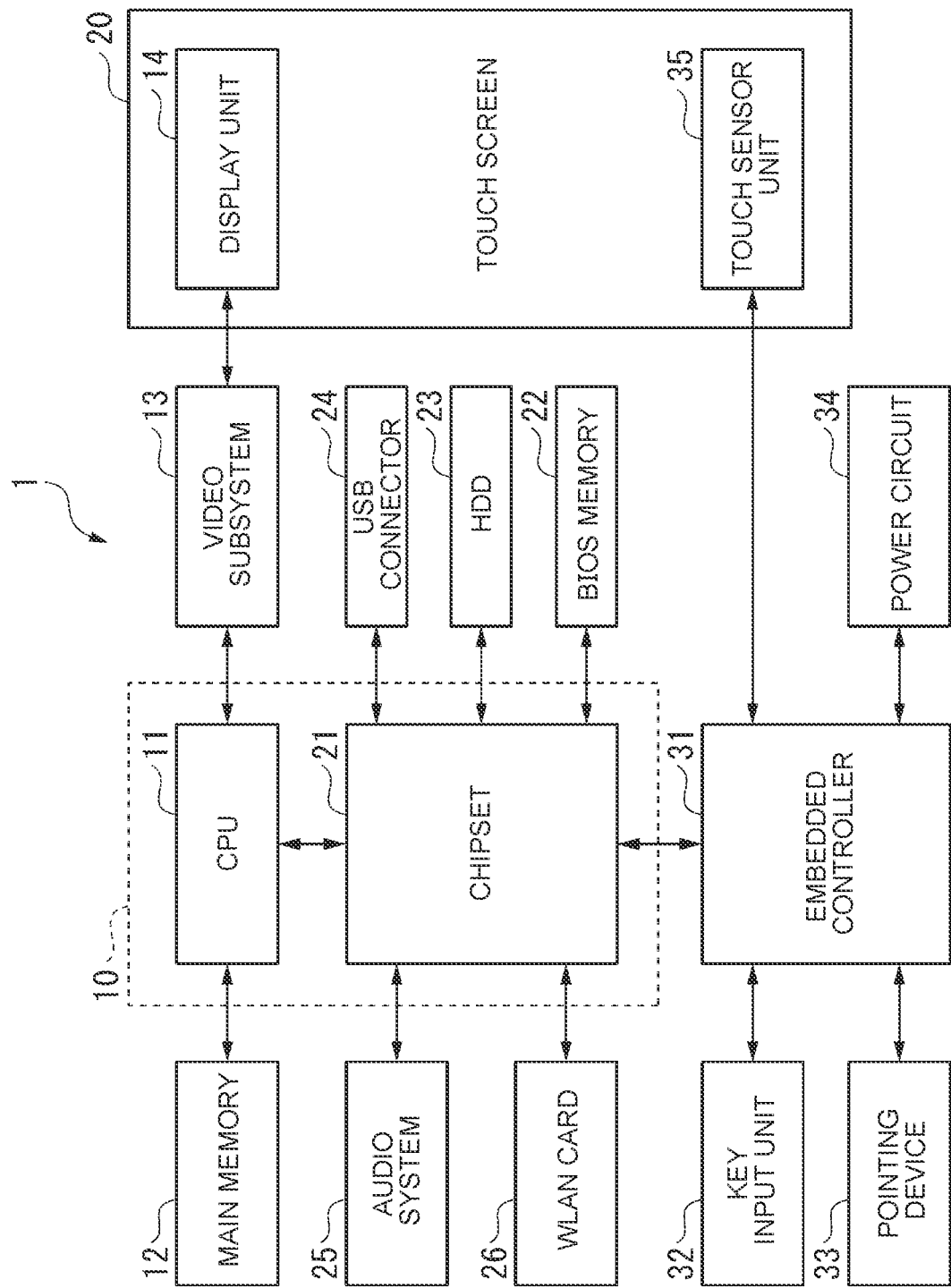
FIG. 1 is a diagram illustrating an example of the main hardware configuration of a laptop PC.

Hereinafter, an information processing apparatus, an information processing system, and a control method according to an embodiment of the present disclosure are described with reference to drawings.

First Embodiment

In handwriting input, besides an input response, which indicates a delay in display in response to input, the drawing quality, which indicates the smoothness of drawn lines, is an important factor. When the drawing quality is attempted to be improved, however, the amount of processing for smoothing the drawn lines increases, and the delay in display in response to input increases, thereby degrading the input response. It would be desirable to provide an information processing apparatus, an information processing system, and a control method capable of appropriately improve the drawing quality and the input response.

In this regard, FIG. 1 illustrates an example of the main hardware configuration of a laptop PC 1 (notebook personal computer) according to a first embodiment. In this embodiment, the laptop PC 1 is described as an example of the information processing apparatus.

As illustrated in FIG. 1, the laptop PC 1 includes a CPU 11, a main memory 12, a video subsystem 13, a display unit 14, a chipset 21, a basic input output system (BIOS) memory 22, a hard disk drive (HDD) 23, a universal series bus (USB) connector 24, an audio system 25, a wireless local area network (WLAN) card 26, an embedded controller 31, a key input unit 32, a pointing device 33, a power circuit 34, and a touch sensor unit 35.

The central processing unit (CPU) 11 performs various arithmetic operations under program control and controls the entire laptop PC 1.

The main memory 12 is a writable memory used as a reading area for the execution program of the CPU 11 or as a working area for writing the processing data of the execution program. The main memory 12 is composed of, for example, a plurality of dynamic random access memory (DRAM) chips. The execution program includes an operating system (OS), various device drivers for hardware operations of peripherals, various services/utilities, application programs, and the like.

The video subsystem 13, which is a subsystem for implementing functions related to image display, includes a video controller. This video controller processes drawing instructions from the CPU 11, writes processed drawing information into a video memory, reads the drawing information from the video memory, and outputs the drawing information as drawing data (display data) to the display unit 14.

The display unit 14, which is, for example, a liquid crystal display or an organic electro-luminescence (EL) display, displays a display screen based on the drawing data (display data) output by the video subsystem 13 as the main screen of the laptop PC 1.

The chipset 21 includes a universal serial bus (USB), a serial AT attachment (ATA), a serial peripheral interface (SPI) bus, a peripheral component interconnect (PCI) bus, a PCI-Express bus, and a low pin count (LPC) bus, to which a plurality of devices is connected. In FIG. 1, as examples of devices, the BIOS memory 22, the HDD 23, the USB connector 24, the audio system 25, the WLAN card 26, and the embedded controller 31 are connected to the chipset 21.

The BIOS memory 22 is composed of an electrically-rewritable non-volatile memory such as, for example, an electrically erasable programmable read-only memory (EEPROM) or a flash ROM. The BIOS memory 22 stores a BIOS, system firmware for controlling the embedded controller 31 or the like, and so on.

The HDD 23 (an example of a non-volatile storage device) stores an OS, various drivers, various services/utilities, application programs, and various data.

The USB connector 24 is used to connect peripherals using USBs.

The audio system 25 records, reproduces, and outputs sound data.

The WLAN card 26 connects to a network through a wireless LAN to perform data communication.

The embedded controller 31 (an example of an embedded control unit) is a one-chip microcomputer that monitors and controls various devices (peripheral devices, sensors, and the like) regardless of the system status of the laptop PC 1. In addition, the embedded controller 31 has a power management function for controlling the power circuit 4. The embedded controller 31 is composed of a CPU, a ROM, a RAM, and the like, which are not illustrated, and includes multi-channel A/D input terminals, D/A output terminals, a timer, and digital input/output terminals. For example, a key input unit 32, a pointing device 33, a power circuit 34, and a touch sensor unit are connected to the embedded controller 31 via these input/output terminals, and the embedded controller 31 controls the operations thereof.

The key input unit 32, which is an input device such as, for example, a keyboard or a touch panel, accepts key input from a user. The pointing device 33, which is an input device such as a mouse or a touchpad, mainly accepts the specification of a position on the display screen and the specification or selection of a target (object) to be operated, such as an operation button.

The power circuit 34 includes, for example, a DC/DC converter, a charge/discharge unit, a battery unit, an AC/DC adapter, and the like, and converts the DC voltage supplied from the AC/DC adapter or the battery unit into a plurality of voltages required to operate the laptop PC 1. In addition, the power circuit 34 supplies electric power to each part of the laptop PC 1 on the basis of the control from the embedded controller 31.

In this embodiment, the CPU 11 and the chipset 21 described above correspond to a main control unit 10. The main control unit 10 performs processes based on the OS (for example, Windows (registered trademark)).

The display unit 14 and the touch sensor unit 35 correspond to a touch screen 20. The touch sensor unit 35 is an input device such as, for example, a touch panel and is placed on top of the display unit 14. The touch sensor unit 35 is placed on the screen of the display unit 14 and detects contact with an object on the screen of the display unit 14. The touch sensor unit 35 detects, for example, when an operating medium such as, for example, a pen contacts the screen, detected position data that indicates the position on the screen of the display unit 14, and detects the contact pressure of the operating medium when the operating medium contacts the screen.

Figure 2:
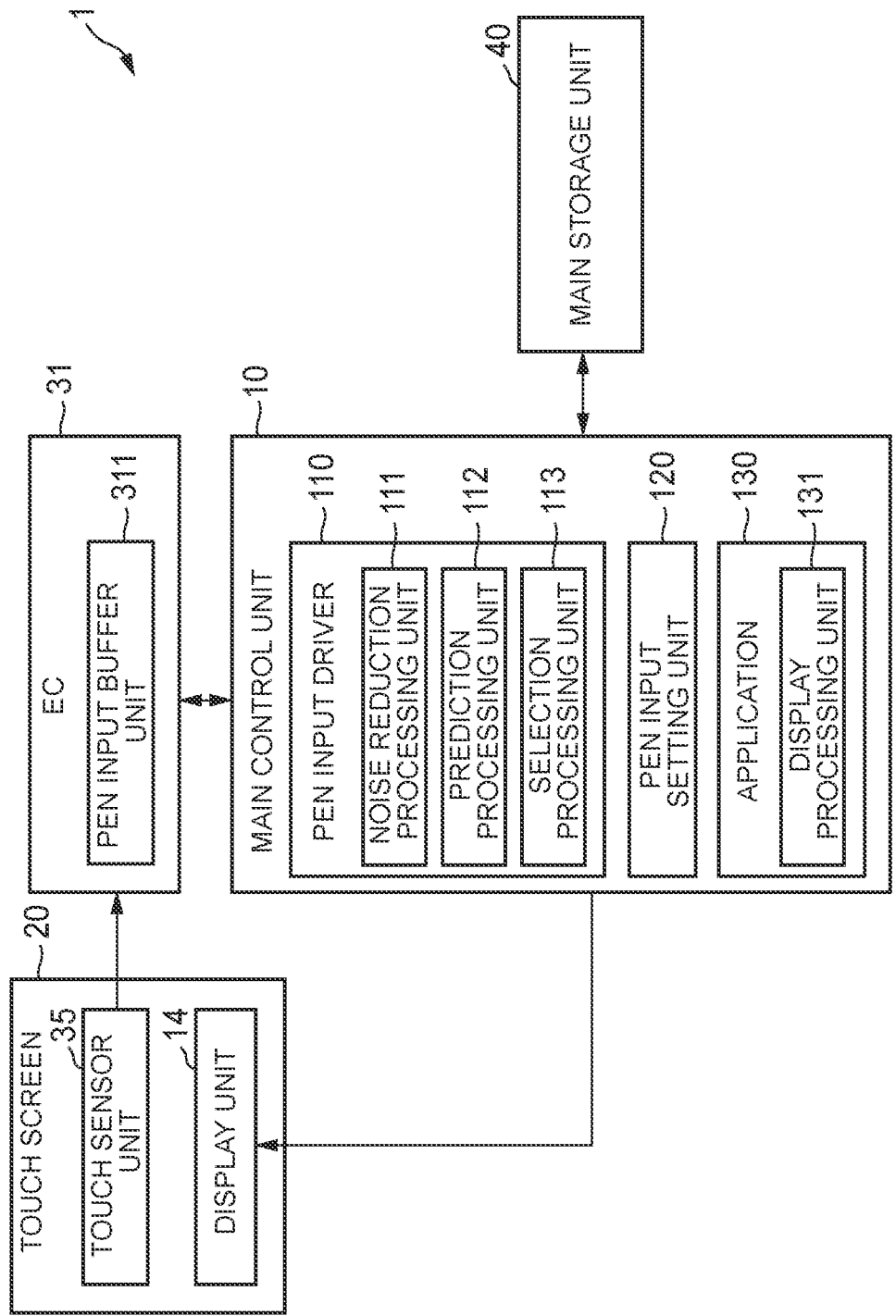
FIG. 2 is a block diagram illustrating an example of the functional configuration of the laptop PC.

Subsequently, with reference to FIG. 2, the functional configuration of the laptop PC 1 according to this embodiment is described. FIG. 2 is a block diagram illustrating an example of the functional configuration of the laptop PC 1 according to this embodiment.

As illustrated in FIG. 2, the laptop PC 1 includes the main control unit 10, the touch screen 20, the embedded controller (EC) 31, and the main storage unit 40. In FIG. 2, only main functional configurations according to this embodiment are described as the configuration of the laptop PC 1.

The main storage unit 40, which is a storage unit implemented by the main memory 12, the HDD 23, or the like, stores various information used by the laptop PC 1. The main storage unit 40 stores, for example, work data, which is used for processing by a pen input driver 110 or an application 130 described later, and setting information of a pen input setting unit 120.

The embedded controller 31 is an embedded control unit different from the main control unit 10. When a pen or any other operating medium contacts the screen of the display unit 14, the embedded controller 31 acquires a plurality of detected position data on the screen detected at predetermined detection intervals by the touch sensor unit 35, and then stores the plurality of acquired detected position data into the pen input buffer unit 311. In addition, the embedded controller 31 outputs the detected position data stored in the pen input buffer unit 311 to the pen input driver 110 in response to a request from the pen input driver 110 of the main control unit 10 described later.

In addition, the embedded controller 31 includes a pen input buffer unit 311.

The pen input buffer unit 311 is composed of, for example, a RAM in the embedded controller 31 and stores the detected position data detected at the predetermined intervals by the touch sensor unit 35 of the touch screen 20 in chronological order. The pen input buffer unit 311 stores, for example, two-dimensional coordinate data on the screen of the display unit 14, which is the detected position data, and the contact pressure in association with each other.

The main control unit 10 is a functional unit implemented by the CPU 11 and the chipset 21 executing the program stored in the main memory 12, and performs various OS-based processes. The main control unit 10 causes the display unit 14 to display a movement locus on the screen, which has been made by a pen or any other operating medium moving in contact with the screen, for example, on the basis of the detected position data output by the embedded controller 31. The main control unit 10 includes the pen input driver 110, the pen input setting unit 120, and the application 130.

The pen input driver 110 (an example of the input processing unit) is a functional unit implemented by the CPU and the chipset 21, and controls pen input processing (handwriting input processing) by the touch screen 20. The pen input driver 110 acquires the detected position data on the screen of the display unit 14 detected by the touch sensor unit 35 from the embedded controller 31, and outputs the detected position data to the application 130. The pen input driver 110 is a device driver added to the OS (for example, Windows (registered trademark)).

The pen input driver 110 selectively performs prediction processing and noise reduction processing according to the drawing status based on the detected position data, and outputs the detected position data of the result of the selectively-performed processing. The drawing status means, for example, the moving speed of the pen (for example, an average speed based on the plurality of detected position data or the like), a change in the moving speed (movement acceleration or the like), a change in the movement angle on the screen, a drawing shape (a curve, a straight line, a character, or the like), and so on. The pen input driver 110 includes a noise reduction processing unit 111, a prediction processing unit 112, and a selection processing unit 113.

The noise reduction processing unit 111 performs noise reduction processing (smoothing processing) for smoothing the detected position data detected by the touch sensor unit 35 by reducing noise. The noise reduction processing unit 111 performs noise reduction processing as illustrated in FIGS. 3 and 4 on the detected position data stored in the pen input buffer unit 311.

Figure 3:
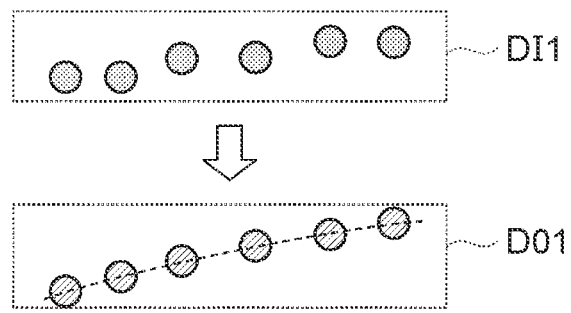
FIG. 3 is a first diagram illustrating an example of noise reduction processing.
Figure 4:
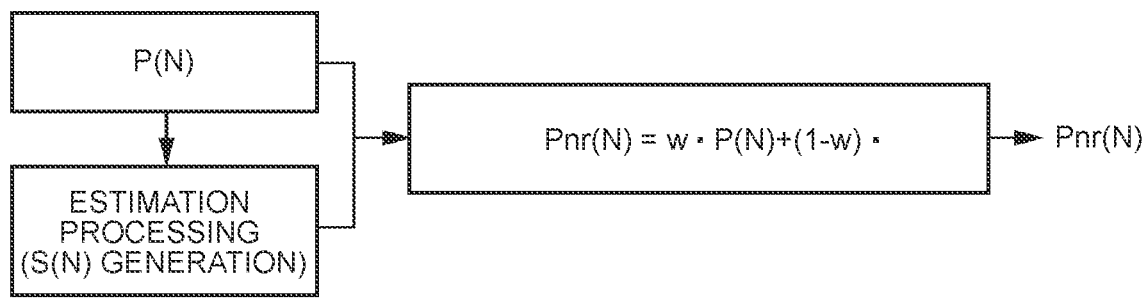
FIG. 4 is a second diagram illustrating an example of the noise reduction processing.

FIGS. 3 and 4 illustrate an example of noise reduction processing in this embodiment.

As illustrated in FIG. 3, the noise reduction processing unit 111 performs the noise reduction processing on the detected position data DI1 detected by the touch screen 20 and outputs the detected position data such as detected position data DO1. The noise reduction processing unit 111 performs the noise reduction processing by using, for example, a Kalman filter.

Specifically, the noise reduction processing unit 111 performs the noise reduction processing through processing as illustrated in FIG. 4. In FIG. 4, P(N) indicates the latest (Nth) detected position data, and S(N) indicates an estimated value of the Nth detected position data using the Kalman filter. The noise reduction processing unit 111 generates the estimated value S(N) of the Nth detected position data on the basis of the past detected position data by using the Kalman filter, and then generates de-noised detected position data Pnr(N) by using P(N) and S(N) through the following equation (1):

$$Pnr(N) = w \cdot P(N) + (1-w) \quad (1)$$

In the above, the variable w is a value more than or equal to "0" and less than or equal to "1" (0≤w≤1) and is a dynamically updated parameter. The variable w is used for weighted addition (weighted sum) of the detected position data P(N) (detected value) and the estimated value of the detected position data S(N).

Returning to the description of FIG. 2, the prediction processing unit 112 performs prediction processing of predicting the next detected position data on the basis of the plurality of past detected position data on the screen detected at the predetermined detection intervals by the touch sensor unit 35. The prediction processing unit 112 performs the prediction processing as illustrated in FIG. 5 on the basis of the detected position data stored in the pen input buffer unit 311.

Figure 5:
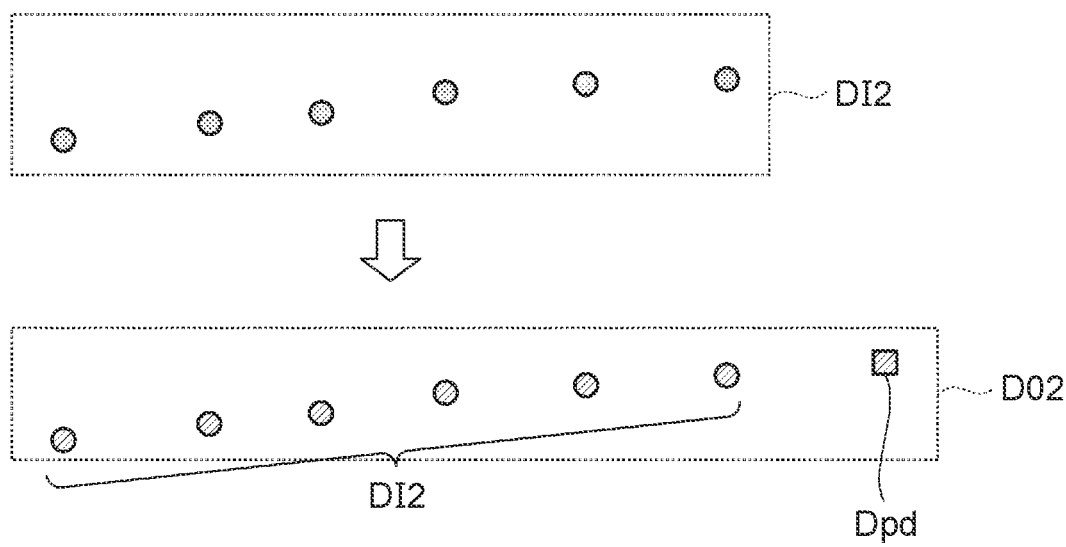
FIG. 5 is a diagram illustrating an example of prediction processing.

FIG. 5 is a diagram illustrating an example of prediction processing in this embodiment.

As illustrated in FIG. 5, the prediction processing unit 112 predicts the next detected position data DO2 on the basis of the plurality of past detected position data DI2. The prediction processing unit 112 predicts the next detected position data DO2 on the basis of the plurality of past detected position data DI2 by using an existing prediction method.

Returning again to the description of FIG. 2, the selection processing unit 113 selectively performs prediction processing by the prediction processing unit 112 and noise reduction processing by the noise reduction processing unit 111 according to the drawing status based on the detected position data, and then outputs the detected position data of the result of the selectively-performed processing. The drawing status includes, for example, the moving speed of the pen (the operating medium) on the screen.

The following describes the processing of calculating the moving speed by the selection processing unit 113.

The selection processing unit 113 calculates the moving speed as described below. For example, with the previous detected position data assumed to be the coordinates ($X_{N-1}$, $Y_{N-1}$) and the latest detected position data assumed to be the coordinates ($X_N$, $Y_N$), the selection processing unit 113 calculates the moving speeds along the X axis and Y axis by the following equations (2).

$$\left. \begin{array}{l} v_x = \dfrac{X_N - X_{N-1}}{\Delta t} \\ v_y = \dfrac{Y_N - Y_{N-1}}{\Delta t} \end{array} \right\} \quad (2)$$

Then, the selection processing unit 113 calculates the moving speed by the following equation (3) on the basis of the respective moving speeds along the X axis and Y axis.

$$|v| = \sqrt{v_x^2 + v_y^2} \quad (3)$$

The selection processing unit 113 selects the processing for the detected position data on the basis of the moving speeds calculated by the equations (2) and (3).

The selection processing unit 113 may use the moving average of the predetermined number of moving speed values as the moving speed.

Specifically, the selection processing unit 113 selects and performs the noise reduction processing out of the noise reduction processing and the prediction processing if the moving speed is less than or equal to a predetermined threshold value (a first threshold value or less). Furthermore, if the moving speed is greater than a predetermined threshold value (a second threshold value), the selection processing unit 113 selects and performs the prediction processing out of the noise reduction processing and the prediction processing.

In this embodiment, description is made on an example in which the first threshold value is equal to the second threshold value described above. In this case, for example, the selection processing unit 113 selects and performs the noise reduction processing out of the noise reduction processing and the prediction processing if the moving speed is less than or equal to a predetermined threshold value v1 (the first threshold value or less). In addition, for example, if the moving speed is greater than the predetermined threshold value v1 (the first threshold value) and less than or equal to a predetermined threshold value v2 (a third threshold value or less) that is greater than the first threshold value, the selection processing unit 113 selects and performs the prediction processing out of the noise reduction processing and the prediction processing. Furthermore, if the moving speed is greater than the predetermined threshold value v2 (the third threshold value), the selection processing unit 113 directly outputs the latest detected position data detected by the touch sensor unit 35 without selecting either the noise reduction processing or the prediction processing.

The pen input setting unit 120 is a functional unit implemented by the CPU 11 and the chipset 21. The pen input setting unit 120 makes a change, for example, in the prediction processing of the above-described detected position data and in the settings of the noise reduction processing (for example, which processing is to be selected [allowed or disallowed], the parameters and level settings for the prediction processing or for the noise reduction processing, and the like) in response to a user's request for change.

The application 130 is a functional unit implemented by the CPU 11 and the chipset 21. The application 130 is executed on the OS to perform, for example, pen input processing (handwriting input processing) using the touch screen 20.

The application 130 acquires the detected position data of the display unit 14 output by the embedded controller 31 via the pen input driver 110, and causes the display unit 14 to display a movement locus on the screen, which has been made by a pen or any other operating medium moving in contact with the screen, on the basis of the acquired detected position data. The application 130 includes a display processing unit 131.

The display processing unit 131 causes the display unit 14 to display a movement locus on the screen, which has been made by the pen or any other operating medium moving in contact with the screen, on the basis of the detected position data output by the pen input driver 110.

With reference to the drawings, the operation of the laptop PC 1 according to this embodiment is described below.

Figure 6:
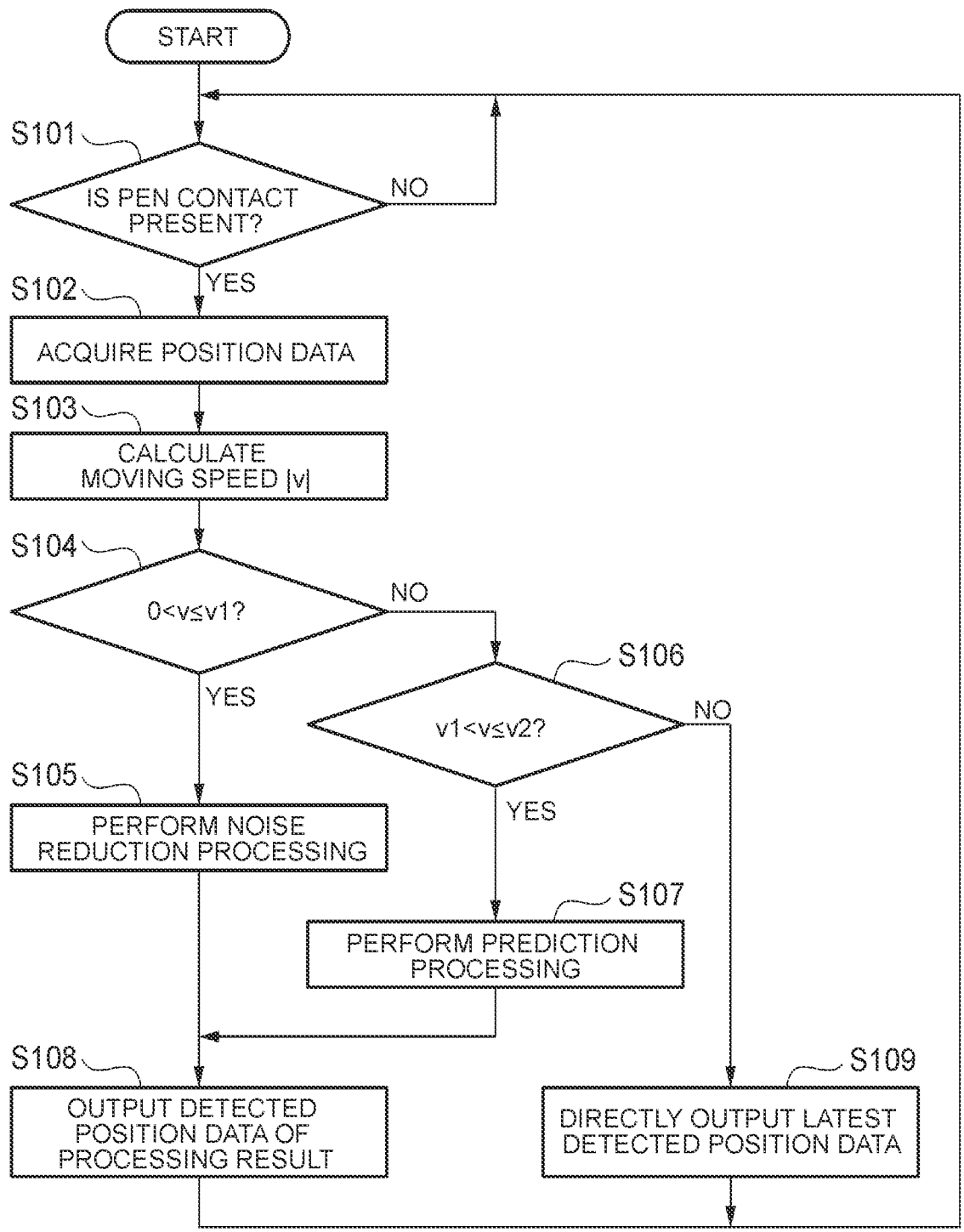
FIG. 6 is a flowchart illustrating an example of pen input processing of the laptop PC.

FIG. 6 is a flowchart illustrating an example of the pen input processing of the laptop PC 1 according to this embodiment.

In FIG. 6, the laptop PC 1 first determines whether or not the pen contact is present on the screen of the display unit 14 (on the panel of the touch sensor unit 35) (step S101). The embedded controller 31 of the laptop PC 1 determines whether or not the pen contact is present on the touch sensor unit 35. If the pen contact is present on the touch sensor unit 35 (step S101: YES), the embedded controller 31 advances the process to step S102. If no pen contact is present on the touch sensor unit 35 (step S101: NO), the embedded controller 31 returns the process to step S101.

In step S102, the embedded controller 31 acquires position data. The embedded controller 31 acquires the detected position data detected by the touch sensor unit 35 and stores the detected position data into the pen input buffer unit 311. The embedded controller 31 outputs event information indicating that the touch sensor unit 35 detects the detected position data to the pen input driver 110 of the main control unit 10.

The pen input driver 110 of the laptop PC 1 then calculates the moving speed M (step S103). The selection processing unit 113 of the pen input driver 110 acquires the detected position data stored in the pen input buffer unit 311 of the embedded controller 31, and calculates the moving speed |v| by using the above-described equations (2) and (3).

Subsequently, the selection processing unit 113 of the pen input driver 110 determines whether or not the moving speed v is greater than "0" and less than or equal to the predetermined threshold value v1 (0<v≤v1) (step S104). If the moving speed v is greater than "0" and less than or equal to the predetermined threshold value v1 (step S104: YES), the selection processing unit 113 advances the process to step S105. Unless the moving speed v is greater than "0" and less than or equal to the predetermined threshold value v1 (step S104: NO), the selection processing unit 113 advances the process to step S106.

In step S105, the pen input driver 110 performs the noise reduction processing. The selection processing unit 113 of the pen input driver 110 causes the noise reduction processing unit 111 to perform the noise reduction processing as illustrated in FIG. 4 on the detected position data to generate detected position data like the detected position data DO1 that has undergone the noise reduction processing illustrated in FIG. 3. After the processing of step S105, the pen input driver 110 advances the process to step S108.

In step S106, the selection processing unit 113 determines whether or not the moving speed v is greater than the predetermined threshold value v1 and less than or equal to the predetermined threshold value v2 (v1<v≤v2). If the moving speed v is greater than the predetermined threshold value v1 and less than or equal to the predetermined threshold value v2 (step S106: YES), the selection processing unit 113 advances the process to step S107. Moreover, unless the moving speed v is greater than the predetermined threshold value v1 and less than or equal to the predetermined threshold value v2 (step S106: NO), the selection processing unit 113 advances the process to step S109.

In step S107, the pen input driver 110 performs prediction processing. The selection processing unit 113 of the pen input driver 110 causes the prediction processing unit 112 to perform the prediction processing as illustrated in FIG. 5 on the detected position data to generate detected position data DO2 that has been predicted. After the processing of step S107, the pen input driver 110 advances the process to step S108.

In step S108, the pen input driver 110 outputs the detected position data of the processing result. Specifically, the selection processing unit 113 of the pen input driver 110 outputs the detected position data of the processing result to the application 130 via the OS. After the processing of step S108, the pen input driver 110 returns the process to step S101.

In step S109, the pen input driver 110 directly outputs the latest detected position data. In other words, the selection processing unit 113 of the pen input driver 110 directly outputs the detected position data acquired from the pen input buffer unit 311 to the application 130 via the OS without performing either the prediction processing or the noise reduction processing. After the processing of step S109, the pen input driver 110 returns the process to step S101.

Subsequently, referring to FIG. 7, a variation of the pen input processing of the laptop PC 1 according to this embodiment is described.

Figure 7:
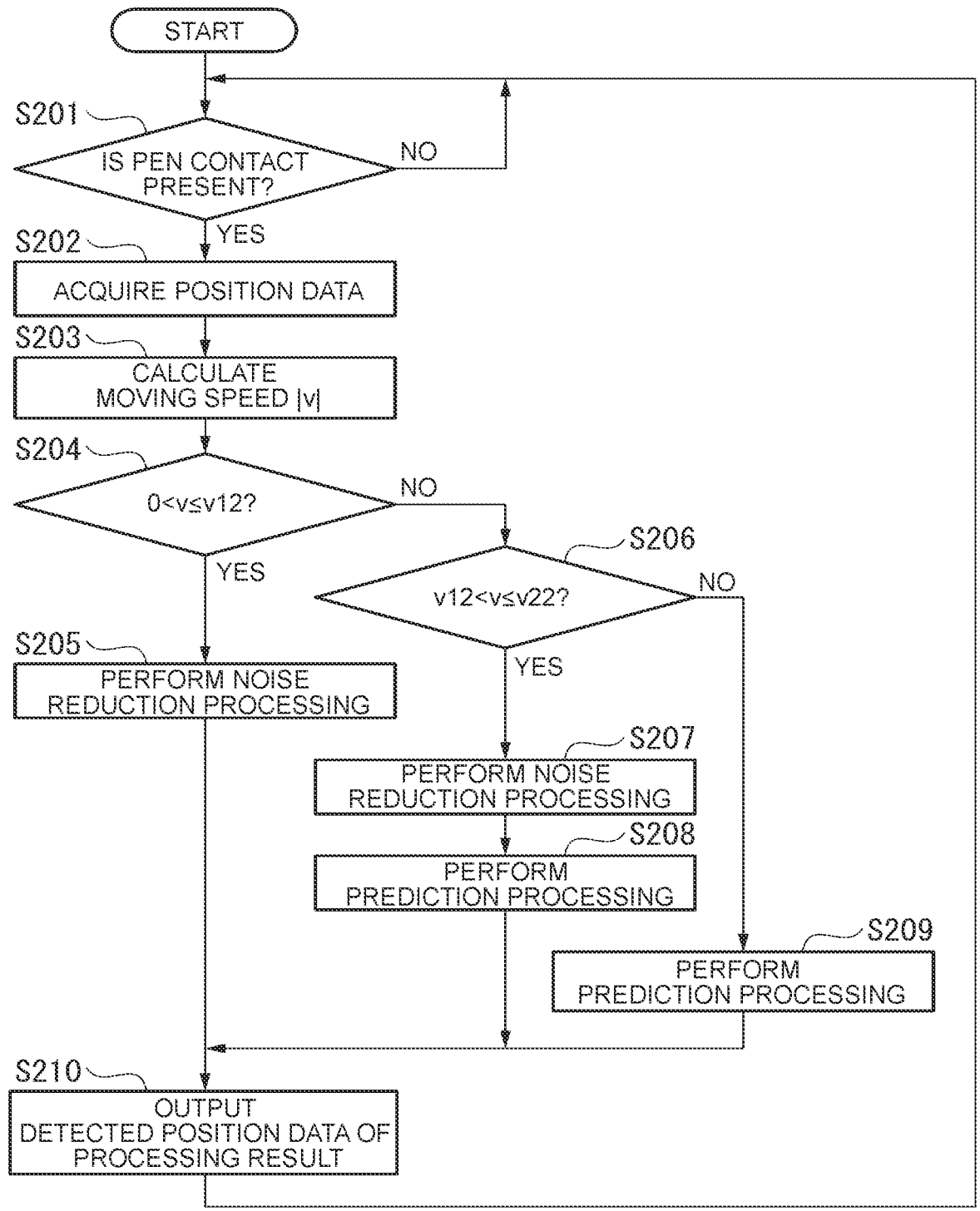
FIG. 7 is a flowchart illustrating a variation of the pen input processing of the laptop PC.

FIG. 7 is a flowchart illustrating the variation of the pen input processing of the laptop PC 1 according to this embodiment.

The variation illustrated in FIG. 7 is an example of a case where the second threshold value is greater than the first threshold value as describe above, and the selection processing unit 113 of the pen input driver 110 selects and performs the noise reduction processing out of the noise reduction processing and the prediction processing if the moving speed is less than or equal to the predetermined threshold value v12 (less than or equal to the first threshold value). Moreover, if the moving speed is greater than the predetermined threshold value v12 (the first threshold value) and less than or equal to a predetermined threshold value v22 (less than or equal to the second threshold value), the selection processing unit 113 selects and performs both of the noise reduction processing and the prediction processing. If the moving speed is greater than the predetermined threshold value v22 (the second threshold value), the selection processing unit 113 selects and performs the prediction processing out of the noise reduction processing and the prediction processing.

In FIG. 7, the processes of steps S201 to S203 are the same as the processes of steps S101 to S103 illustrated in FIG. 6 described above, and therefore the description thereof is omitted here.

In step S204, the selection processing unit 113 of the pen input driver 110 determines whether or not the moving speed v is greater than "0" and less than or equal to the predetermined threshold value v12 ($0<v\leq v12$). If the moving speed v is greater than "0" and less than or equal to the predetermined threshold value v12 (step S204: YES), the selection processing unit 113 advances the process to step S205. Unless the moving speed v is greater than "0" and less than or equal to the predetermined threshold value v12 (step S204: NO), the selection processing unit 113 advances the process to step S206.

In step S205, the pen input driver 110 performs the noise reduction processing. The selection processing unit 113 of the pen input driver 110 causes the noise reduction processing unit 111 to perform the noise reduction processing as illustrated in FIG. 4 on the detected position data to generate the detected position data like the detected position data DO1 that has undergone the noise reduction processing illustrated in FIG. 3. After the processing of step S205, the pen input driver 110 advances the process to step S210.

Furthermore, in step S206, the selection processing unit 113 determines whether or not the moving speed v is greater than the predetermined threshold value v12 and less than or equal to the predetermined threshold value v22 ($v12<v\leq v22$). If the moving speed v is greater than the predetermined threshold value v12 and less than or equal to the predetermined threshold value v22 (step S206: YES), the selection processing unit 113 advances the process to step S207. Unless the moving speed v is greater than the predetermined threshold value v12 and less than or equal to the predetermined threshold value v22 (step S206: NO), the selection processing unit 113 advances the process to step S209.

In step S207, the noise reduction processing is performed. The selection processing unit 113 of the pen input driver 110 causes the noise reduction processing unit 111 to perform the noise reduction processing on the detected position data to generate the detected position data that has undergone the noise reduction processing.

Subsequently, the pen input driver 110 performs the prediction processing (step S208). The selection processing unit 113 of the pen input driver 110 causes the prediction processing unit 112 to perform the prediction processing as illustrated in FIG. 5 on the detected position data to generate detected position data DO2 that has been predicted. After the processing of step S208, the pen input driver 110 advances the process to step S210.

In step S209, the pen input driver 110 performs the prediction processing. The selection processing unit 113 causes the prediction processing unit 112 to perform the prediction processing on the detected position data to generate detected position data that has been predicted. After the processing of step S209, the pen input driver 110 advances the process to step S210.

In step S210, the pen input driver 110 outputs the detected position data of the processing result. Specifically, the selection processing unit 113 of the pen input driver 110 outputs the detected position data of the processing result to the application 130 via the OS. After the processing of step S210, the pen input driver 110 returns the process to step S201.

As described above, the laptop PC 1 (the information processing apparatus) according to this embodiment includes the display unit 14, the touch sensor unit 35, the pen input driver 110 (input processing unit), and the display processing unit 131. The touch sensor unit 35 is placed on the screen of the display unit 14 and detects contact with objects on the screen. The pen input driver 110 selectively performs the prediction processing and the noise reduction processing according to the drawing status (for example, pen moving speed or the like) based on the detected position data and outputs the detected position data of the result of the selectively-performed processing. The prediction processing is a process to predict the next detected position data on the basis of a plurality of past detected position data on the screen detected at the predetermined detection intervals by the touch sensor unit 35 when the operating medium contacts the screen. Furthermore, the noise reduction processing is a process to remove noise from the detected position data detected by the touch sensor unit 35 for smoothing. The display processing unit 131 causes the display unit 14 to display a movement locus on the screen, which has been made by an operating medium moving in contact with the screen, on the basis of the detected position data output by the pen input driver 110.

Thus, the laptop PC 1 according to this embodiment selectively performs the prediction processing and the noise reduction processing according to the drawing status (for example, pen moving speed or the like), thereby appropriately improving the drawing quality and the input response in handwriting input. In other words, by selectively performing the prediction processing and the noise reduction processing, the laptop PC 1 according to this embodiment is able to appropriately improve both the drawing quality and the input response in handwriting input.

Furthermore, in this embodiment, the drawing status includes the moving speed on the screen of the operating medium. The pen input driver 110 selects and performs the noise reduction processing out of the noise reduction processing and the prediction processing if the moving speed is less than or equal to the first threshold value (for example, less than or equal to the predetermined threshold value v1). Moreover, the pen input driver 110 selects and performs the prediction processing out of the noise reduction processing and the prediction processing if the moving speed is greater than the second threshold value (for example, the predetermined threshold value v1).

Thereby, the laptop PC 1 according to this embodiment selects and performs the noise reduction processing if, for example, an input response is not a problem but the moving speed is too slow, which causes a problem in the drawing quality (if the moving speed is less than or equal to the first threshold value [for example, less than or equal to the first threshold value v1]). Furthermore, the laptop PC 1 according to this embodiment selects and performs the prediction processing if, for example, the drawing quality is not a problem but the moving speed is too fast, which causes a problem in the input response, (if the moving speed is greater than the second threshold value [for example, the predetermined threshold value v1]). Therefore, the laptop PC 1 according to this embodiment is able to improve the drawing quality and the input response by appropriate selection.

In general, a low moving speed of pen input does not cause a slow input response, but the wobble of drawing lines is noticeable, and therefore noise reduction processing is more important. Moreover, a high moving speed of pen input does not cause a noticeable wobble of drawing lines, but a delay in the input response is noticeable, and therefore prediction processing is more important. Therefore, as described above, the laptop PC 1 according to this embodiment selects and performs the prediction processing if the moving speed is high, and selects and performs the noise reduction processing if the moving speed is low. Therefore, the laptop PC 1 is able to improve the drawing quality and the input response by appropriate selection.

In this embodiment, the first threshold value and the second threshold value described above are equal to each other. The pen input driver 110 selects and performs the noise reduction processing out of the noise reduction processing and the prediction processing if the moving speed is less than or equal to the first threshold value (less than or equal to the predetermined threshold value v1). Moreover, the pen input driver 110 selects and performs the prediction processing out of the noise reduction processing and the prediction processing if the moving speed is greater than the first threshold value (the predetermined threshold value v1) and less than or equal to the third threshold value (the predetermined threshold value v2 or less), which is greater than the first threshold value (the predetermined threshold value v1). Furthermore, if the moving speed is greater than the third threshold value (the predetermined threshold value v2), the pen input driver 110 directly outputs the latest detected position data detected by the touch sensor unit 35 without selecting either the noise reduction processing or the prediction processing.

Thereby, the laptop PC 1 according to this embodiment is able to improve the drawing quality and the input response by appropriate selection based on the moving speed.

In addition, in this embodiment, the drawing status includes at least one of the following: the movement acceleration on the screen of the operating medium; a moving distance in a predetermined time interval; a change in movement angle on the screen of the operating medium; and a drawing shape (a straight line, a curve, a character, or the like).

Thereby, the laptop PC 1 according to this embodiment is able to improve the drawing quality and the input response by appropriate selection based on the drawing status.

In addition, the laptop PC 1 according to this embodiment includes the main control unit 10 that performs processing based on an OS (for example, Windows (registered trademark)). The main control unit 10 includes a pen input driver 110 and a display processing unit 131. The pen input driver 110 is implemented by a device driver added to the OS.

Thereby, the laptop PC 1 according to this embodiment is able to improve the drawing quality and the input response appropriately in handwriting input without depending on the application 130 running on the OS.

In the variation of this embodiment, the second threshold value (the predetermined threshold value v22) is greater than the first threshold value (the predetermined threshold value v12). If the moving speed is less than or equal to the first threshold value (less than or equal to the predetermined threshold value v12), then the pen input driver 110 selects and performs the noise reduction processing out of the noise reduction processing and the prediction processing. Moreover, if the moving speed is greater than the first threshold value (the predetermined threshold value v12) and less than or equal to the second threshold value (less than or equal to the predetermined threshold value v22), the pen input driver 110 selects and performs both of the noise reduction processing and the prediction processing. Furthermore, if the moving speed is greater than the second threshold value (the predetermined threshold value v22), the pen input driver 110 selects and performs the prediction processing out of the noise reduction processing and the prediction processing.

Thereby, the laptop PC 1 according to this embodiment is able to improve the drawing quality and the input response by appropriate selection based on the moving speed.

Moreover, a control method according to this embodiment is a control method for a laptop PC 1 having a display unit 14 and a touch sensor unit 35 that is placed on the screen of the display unit 14 and detects contact with an object on the screen, the control method including an input processing step and a display processing step. In the input processing step, the pen input driver 110 selectively performs the above-mentioned prediction processing and noise reduction processing according to the drawing status based on the detected position data, and then outputs the detected position data of the result of the selectively-performed processing. In the display processing step, the display processing unit 131 causes the display unit 14 to display a movement locus on the screen, which has been made by an operating medium moving in contact with the screen, on the basis of the detected position data output in the input processing step.

Thereby, the control method according to this embodiment has the same advantageous effects as those of the above-mentioned laptop PC 1 and is able to improve the drawing quality and the input response appropriately in handwriting input.

In addition, the laptop PC 1 (the information processing apparatus) according to this embodiment may be in the following form. The laptop PC 1 (the information processing apparatus) according to this embodiment includes: a display unit 14; a touch sensor unit 35 that is placed on the screen of the display unit 14 and detects contact with an object on the screen; a memory (for example, a main memory 12) that temporarily stores a program; and a processor (for example, the CPU 11 and the chipset 21) that executes the program stored in the memory (for example, the main memory 12). This processor performs input processing and display processing by executing the program stored in the memory. The input processing here is processing of selectively performing the above-mentioned prediction processing and noise reduction processing according to the drawing status based on the detected position data and then outputting the detected position data of the result of the selectively-performed processing. The display processing is performed to cause the display unit 14 to display a movement locus on the screen, which has been made by the operating medium moving in contact with the screen, on the basis of the detected position data output by the input processing.

Thereby, the laptop PC 1 according to this embodiment is able to appropriately improve the drawing quality and the input response in handwriting input.

Second Embodiment

Subsequently, a laptop PC 1*a* according to a second embodiment is described with reference to the drawings.

Figure 8:
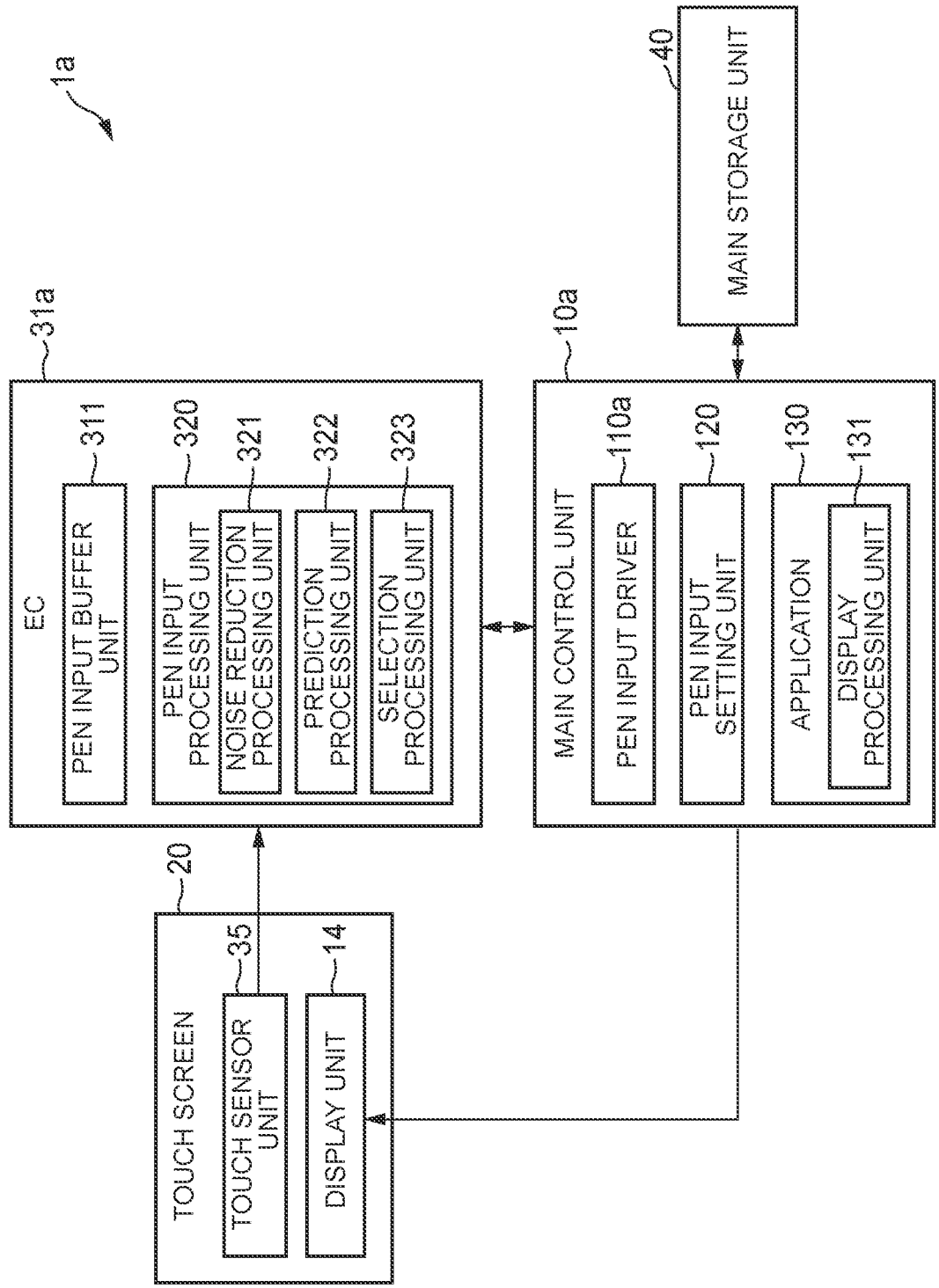
FIG. 8 is a block diagram illustrating an example of the functional configuration of a laptop PC.

FIG. 8 is a block diagram illustrating an example of the functional configuration of the laptop PC 1a according to the second embodiment. Since the main hardware configuration of the laptop PC 1a according to this embodiment is the same as of the first embodiment illustrated in FIG. 1 described above, the description of the main hardware configuration is omitted here.

In FIG. 8, the same reference numerals are given to the same components as those in FIG. 2 described above, and the description thereof is omitted.

In this embodiment, description is made on a variation, in which an embedded controller 31a performs the noise reduction processing, the prediction processing, and the processing of selecting the noise reduction processing and the prediction processing, which have been performed by the pen input driver 110 in the first embodiment.

As illustrated in FIG. 8, the laptop PC 1a includes a main control unit 10a, a touch screen 20, an embedded controller (EC) 31a, and a main storage unit 40. In FIG. 8, only the main functional configuration of this embodiment is described as the configuration of the laptop PC 1a.

The embedded controller 31a includes a pen input buffer unit 311 and a pen input processing unit 320.

The pen input processing unit 320 (an example of the input processing unit) is a functional unit in which the functions of the noise reduction processing unit 111, the prediction processing unit 112, and the selection processing unit 113 in the first embodiment have been moved from the pen input driver 110 to the embedded controller 31a. The pen input processing unit 320 is a functional unit implemented by causing the CPU and memory in the inside of the embedded controller 31a to execute the program stored in the memory. The pen input processing unit 320 includes a noise reduction processing unit 321, a prediction processing unit 322, and a selection processing unit 323.

The noise reduction processing unit 321, the prediction processing unit 322, and the selection processing unit 323 correspond to the noise reduction processing unit 111, the prediction processing unit 112, and the selection processing unit 113 in the first embodiment, respectively. In other words, the noise reduction processing unit 321, the prediction processing unit 322, and the selection processing unit 323 perform the same processes as those of the noise reduction processing unit 111, the prediction processing unit 112, and the selection processing unit 113, respectively. Therefore, the description thereof is omitted here.

The (selection processing unit 323 of the) pen input processing unit 320 outputs the detected position data of the result of the selectively-performed processing of the noise reduction processing unit 111 and the prediction processing unit 112 to the main control unit 10a.

The main control unit 10a, which is a functional unit implemented by the CPU 11 and the chipset 21 executing the program stored in the main memory 12, performs various OS-based processes. The main control unit 10a includes a pen input driver 110a, a pen input setting unit 120, and an application 130.

The pen input driver 110a, which is a functional unit implemented by the CPU 11 and the chipset 21, controls the pen input processing (handwriting input processing) using the touch screen 20. The pen input driver 110a acquires the detected position data from the embedded controller 31a after the processing by the pen input processing unit 320 and outputs the detected position data to the application 130. The pen input driver 110a is a device driver added to the OS (for example, Windows (registered trademark)).

As described above, the laptop PC 1a according to this embodiment includes the main control unit 10a, which performs OS-based processing, and the embedded controller 31a, which is an embedded control unit different from the main control unit 10a. The pen input processing unit 320 (input processing unit) is included in the embedded controller 31a (embedded control unit). The pen input processing unit 320 (input processing unit) selectively performs the prediction processing and the noise reduction processing according to the drawing status (for example, the moving speed of a pen or the like) based on the detected position data, and then outputs the detected position data of the result of the selectively-performed processing to the main control unit 10a. The display processing unit 131 is included in the main control unit 10a. The display processing unit 131 causes the display unit 14 to display the movement locus on the screen, which has been made by an operating medium moving in contact with the screen, on the basis of the detected position data output by the pen input processing unit 320 via the pen input driver 110a.

Thereby, the laptop PC 1a according to this embodiment is able to appropriately improve the drawing quality and the input response in handwriting input without depending on the device driver (pen input driver 110a) and the application 130 running on the OS.

Third Embodiment

Subsequently, a PC system 100 according to a third embodiment is described with reference to the drawings.

The laptop PC 1 (1a) having the touch screen 20 inside to perform handwriting input such as pen input has been described in the above-described first and second embodiments. In the third embodiment, however, a variation is described in the case of performing handwriting input such as pen input by using the PC system 100 that includes an external pen tablet 50 with a touch screen 52 and a laptop PC 1b.

Figure 9:
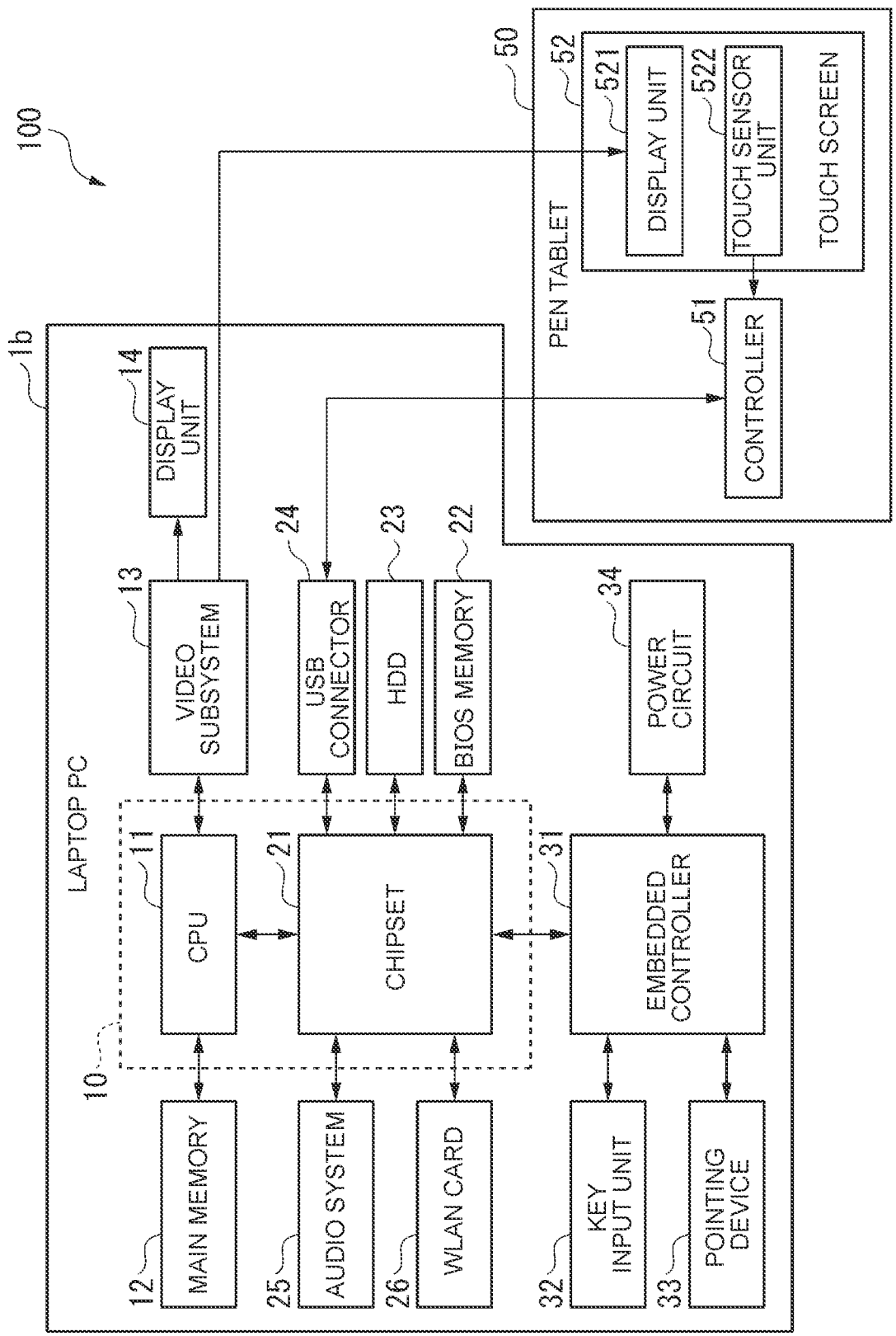
FIG. 9 is a diagram illustrating an example of the main hardware configuration of a PC system.

FIG. 9 illustrates an example of the main hardware configuration of the PC system 100 according to this embodiment.

As illustrated in FIG. 9, the PC system 100 (an example of the information processing system) includes a laptop PC 1b and a pen tablet 50.

In FIG. 9, the same components as in FIG. 1 are given the same reference numerals and the description thereof is omitted.

The laptop PC 1b (an example of the information processing apparatus) has the same hardware configuration as the laptop PC 1 (1a) described above, except that the laptop PC 1b does not include the touch screen 20 (the touch sensor unit 35).

The pen tablet 50 is a tablet terminal that enables handwriting input such as pen input, and includes a controller 51 and a touch screen 52.

The controller 51 (an example of the embedded control unit) is, for example, a processor including a CPU, and controls the pen tablet 50 comprehensively. The controller 51 performs the same processing as the embedded controller 31 (31a) described above in the case of performing the processing of the handwriting input such as pen input. In other words, the controller 51 may be configured to have the same functions as those of the pen input buffer unit 311 and the pen input processing unit 320 described above.

Moreover, the controller 51 is connected to the chipset (the main control unit 10 (10a)) via the USB connector 24.

The controller 51 outputs the detected position data obtained by the touch sensor unit 35 to the main control unit 10 (10a) by using a USB interface.

The touch screen 52 includes a display unit 521 and a touch sensor unit 522, and functions in the same manner as the touch screen 20 described above. The display unit 521 and the touch sensor unit 522 in this embodiment correspond to the display unit 14 and the touch sensor unit 35 of the first and second embodiments, respectively.

The display unit 521 is connected to the main control unit 10 (10a) via the video subsystem 13, for example, by the high-definition multimedia interface (HDMI) (registered trademark) or a display port (DP). The main control unit 10 (10a) causes the display unit 521 to display a movement locus on the screen, which has been made by an operating medium moving in contact with the screen of the display unit 521, on the basis of the detected position data output by the controller 51 using the HDMI (registered trademark) or DP.

Subsequently, the operation of the PC system 100 according to this embodiment is described.

In this embodiment, instead of the embedded controller 31a of the second embodiment, the controller 51, which has the same functions as the pen input processing unit 320, may perform the noise reduction processing, the prediction processing, and the processing of selecting the noise reduction processing or the prediction processing, or as in the first embodiment, the pen input driver 110 may perform the noise reduction processing, the prediction processing, and the processing of selecting the noise reduction processing or the prediction processing. The details of the noise reduction processing, the prediction processing, and the processing of selecting the noise reduction processing or the prediction processing are the same as those of the first and second embodiments, and therefore the description thereof is omitted here.

As described above, the PC system 100 (information processing system) according to this embodiment includes the display unit 521, the touch sensor unit 522, the input processing unit (the pen input driver 110 or the controller 51), and the display processing unit 131. The touch sensor unit 522 is placed on the screen of the display unit 521 and detects contact with an object on the screen. The input processing unit (the pen input driver 110 or the controller 51) selectively performs the prediction processing and the noise reduction processing according to the drawing status based on the detected position data, and outputs the detected position data of the result of the selectively-performed processing.

Thereby, the PC system 100 according to this embodiment has the same advantageous effects as those of the above-mentioned laptop PC 1 (1a) and is able to improve the drawing quality and the input response appropriately in handwriting input. Moreover, the PC system 100 according to this embodiment is able to appropriately improve the drawing quality and the input response in handwriting input without depending on the application.

The present disclosure is not limited to the above embodiments, but can be modified to the extent not to depart from the purpose of the present disclosure.

For example, although an example in which the information processing apparatus is the laptop PC 1 (1a, 1b) has been described in the above embodiments, the information processing apparatus is not limited thereto, but may be any one of other information processing apparatuses such as a tablet terminal, a desktop PC, and a smartphone. Furthermore, the information processing system is not limited to the PC system 100 including the laptop PC 1b, but may be one including any one of other information processing apparatuses as described above.

Although the example of using the moving speed has been described as an example of the drawing status in each of the above embodiments, but the drawing status is not limited thereto. For example, the drawing status may be the moving speed of the pen (for example, the average speed based on a plurality of detected position data or the like), a change in the moving speed (the movement acceleration or the like), a change in the movement angle on the screen, a moving distance in a predetermined time interval, and a drawing shape (a curve, a straight line, a character, or the like).

For example, in the case where the drawing status is a change in the moving speed (the movement acceleration or the like), the input processing unit (the pen input driver 110, the pen input processing unit 320, or the controller 51) may select the prediction processing if the change in the moving speed increases, and may select the noise reduction processing if the change in the moving speed decreases.

Moreover, in the case where the drawing status is a change in the movement angle on the screen, the input processing unit (the pen input driver 110, the pen input processing unit 320, or the controller 51) may select the noise reduction processing if the change in the movement angle is large, and may select the prediction processing if the change in the movement angle is small.

For example, in the case where the drawing status is the moving distance in a predetermined time interval, the input processing unit (the pen input driver 110, the pen input processing unit 320, or the controller 51) may select the prediction processing if the moving distance is large, and may select the noise reduction processing if the moving distance is small.

Moreover, for example, in the case where the drawing status is a drawing shape (a curve, a straight line, a character, or the like), the input processing unit (the pen input driver 110, the pen input processing unit 320, or the controller 51) may select the prediction processing if the drawing shape is a straight line, and may select the noise reduction processing if the drawing shape is a curve or a character.

Furthermore, the drawing status may be a combination of the pen's moving speed and each of the above-mentioned drawing statuses.

Although a pen is used as an example of an operating medium for handwriting input in the description in each of the above embodiments, the operating medium is not limited thereto, but may be, for example, a user's finger, a dedicated electronic pen, or other operating mediums.

Although the Kalman filter is used for the noise reduction processing as an example in the description in each of the above embodiments, the method is not limited thereto, but, for example, an adaptive filter or other methods may be used.

Furthermore, although the noise reduction processing, the prediction processing, and the selection processing in the present disclosure are performed by the pen input driver 110, the pen input processing unit 320 of the embedded controller 31a, or the controller 51 as an example in the description in each of the above embodiments, the present disclosure is not limited thereto, but these processes may be performed by the application 130, for example.

The configuration of the laptop PC 1 (1a) and the configuration of the PC system 100 described above each have a computer system inside. The processes in the configuration of the laptop PC 1 (1a) and in the configuration of the PC system 100 described above may be performed by recording programs for implementing the functions of the configuration of the laptop PC 1 (1*a*) and of the configuration of the PC system 100 described above on a computer-readable recording medium, causing the computer system to read the programs recorded on the recording medium, and executing the programs. The term "causing the computer system to read the programs recorded on the recording medium and executing the programs" in the above includes installing the programs on the computer system. The term "computer system" here shall include hardware such as the OS and peripherals.

In addition, the term "computer system" may also include a plurality of computer devices connected via a network including communication lines such as the Internet, WAN, LAN, and dedicated lines. Moreover, the term "computer-readable recording medium" means a portable medium, such as a flexible disk, a magneto-optical disk, a ROM, or a CD-ROM, or a storage device such as a hard disk, which is built in a computer system. Thus, the recording medium storing the programs may be a non-transitory recording medium such as a CD-ROM.

The recording medium also includes an internal or external recording medium that can be accessed by a distribution server to distribute an appropriate program. The program may be divided into a plurality of programs, each of which is downloaded at a different timing and then combined with each of the configurations provided in the laptop PC 1 (1*a*) and the PC system 100, or the delivery servers that deliver the respective divided programs may be different from each other. Furthermore, the term "computer-readable recording medium" shall also include a medium that holds the program for a certain period of time, such as a volatile memory (RAM) inside a computer system that serves as a server or a client in the case where the program is transmitted via a network. The above programs may be used to implement some of the functions described above. Moreover, the program may be a so-called difference file (difference program), in which the above-described functions are able to be implemented in combination with the programs already recorded in the computer system.

Moreover, some or all of the above-described functions may be implemented as an LSI (large scale integration) or other integrated circuit. Each of the above-described functions may be made into a processor individually, or may be partially or fully integrated into a processor. The method of making an integrated circuit is not limited to LSI, but may be implemented by a dedicated circuit or a general-purpose processor. If an alternative integrated circuit technology to LSI emerges as a result of advances in the semiconductor technology, an integrated circuit based on the technology may be used.

The invention claimed is:

1. An information processing apparatus, comprising:
a display including a touchscreen that detects contact on the touchscreen as position data; and
a processor coupled to the display and that:
calculates a drawing speed based on a plurality of past detected position data on the touchscreen, the plurality of past detected position data being detected by the touchscreen at a predetermined detection interval;
when the drawing speed is within a first numerical range, performs prediction processing; and
when the drawing speed is within a second numerical range different from the first numerical range, performs smoothing processing, wherein the prediction processing includes predicting a future position data based on at least a subset of the plurality of past detected position data and controlling the display to display based on the future position data, and
the smoothing processing includes removing noise from at least a subset of the plurality of past detected position data to generate a plurality of smoothed position data and controlling the display to display based on the plurality of smoothed position data.

2. An information processing apparatus, comprising:
a display unit;
a touch sensor unit placed on a screen of the display unit to detect contact with an object on the screen;
an input processing unit that selectively performs prediction processing for predicting the next detected position data on the basis of a plurality of past detected position data on the screen detected at predetermined detection intervals by the touch sensor unit when an operating medium contacts the screen and noise reduction processing for removing noise from the detected position data detected by the touch sensor unit for smoothing, according to a drawing status based on the detected position data, and then outputs the detected position data of a result of the selectively-performed processing; and
a display processing unit that causes the display unit to display a movement locus on the screen, the movement locus having been made by the operating medium moving in contact with the screen, on the basis of the detected position data output by the input processing unit.

3. The information processing apparatus according to claim 2, wherein
the drawing status includes a moving speed on the screen of the operating medium, and
the input processing unit performs the processing of:
selecting and performing the noise reduction processing out of the noise reduction processing and the prediction processing in the case where the moving speed is less than or equal to a first threshold value; and
selecting and performing the prediction processing out of the noise reduction processing and the prediction processing in the case where the moving speed is greater than a second threshold value.

4. The information processing apparatus according to claim 3, wherein
the first threshold value is equal to the second threshold value, and
the input processing unit performs the processing of:
selecting and performing the noise reduction processing out of the noise reduction processing and the prediction processing in the case where the moving speed is less than or equal to the first threshold value;
selecting and performing the prediction processing out of the noise reduction processing and the prediction processing in the case where the moving speed is greater than the first threshold value and less than or equal to a third threshold value greater than the first threshold value; and
directly outputting the latest detected position data detected by the touch sensor unit without selecting either the noise reduction processing or the prediction processing in the case where the moving speed is greater than the third threshold value.

5. The information processing apparatus according to claim 3, wherein the second threshold value is greater than the first threshold value, and the input processing unit performs the processing of:
- selecting and performing the noise reduction processing out of the noise reduction processing and the prediction processing in the case where the moving speed is less than or equal to the first threshold value;
- selecting and performing both of the noise reduction processing and the prediction processing in the case where the moving speed is greater than the first threshold value and less than or equal to the second threshold value; and
- selecting and performing the prediction processing out of the noise reduction processing and the prediction processing in the case where the moving speed is greater than the second threshold value.

6. The information processing apparatus according to claim 2, wherein the drawing status includes at least one of the movement acceleration on the screen of the operating medium, a change in movement angle on the screen of the operating medium, and a drawing shape.

7. The information processing apparatus according to claim 2, further comprising:
a main control unit that performs processing based on an operating system (OS), the main control unit including the input processing unit and the display processing unit, wherein
the input processing unit is implemented by a device driver added to the OS.

8. The information processing apparatus according to claim 2, further comprising:
a main control unit that performs processing based on an operating system (OS); and
an embedded control unit different from the main control unit, wherein
the input processing unit is included in the embedded control unit,
the display processing unit is included in the main control unit, and
the input processing unit outputs the detected position data of a result of the processing to the main control unit.

9. A control method for an information processing apparatus including a display unit and a touch sensor unit placed on a screen of the display unit to detect contact with an object on the screen, the control method comprising:
an input processing step in which an input processing unit selectively performs prediction processing for predicting the next detected position data on the basis of a plurality of past detected position data on the screen detected at predetermined detection intervals by the touch sensor unit when an operating medium contacts the screen and noise reduction processing for removing noise from the detected position data detected by the touch sensor unit for smoothing, according to a drawing status based on the detected position data, and then outputs the detected position data of a result of the selectively-performed processing; and
a display processing step in which the display processing unit causes the display unit to display a movement locus on the screen, the movement locus having been made by the operating medium moving in contact with the screen, on the basis of the detected position data output by the input processing step.

* * * * *